UNITED STATES PATENT OFFICE.

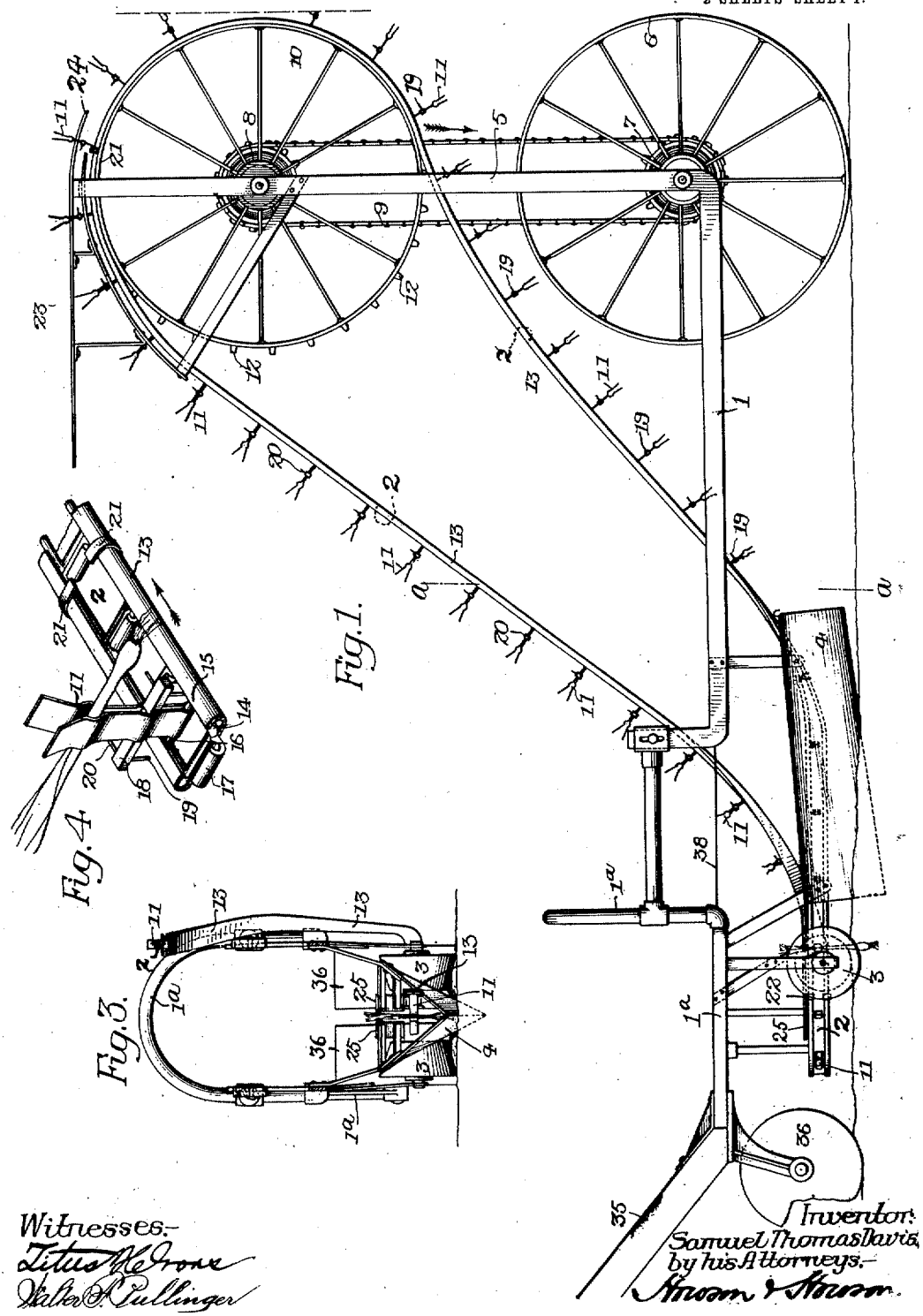

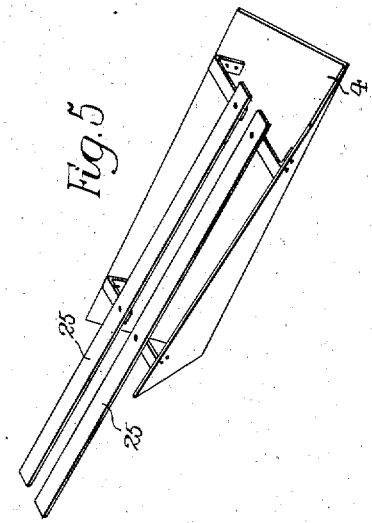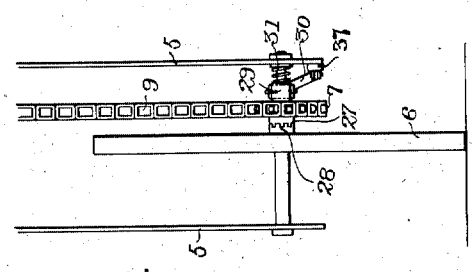

SAMUEL T. DAVIS, OF PHILADELPHIA, PENNSYLVANIA.

PLANT-SETTING MACHINE.

986,145.  Specification of Letters Patent.  Patented Mar. 7, 1911.

Application filed December 19, 1908. Serial No. 468,358.

*To all whom it may concern:*

Be it known that I, SAMUEL THOMAS DAVIS, a citizen of the United States, residing in Philadelphia, Pennsylvania, have invented certain Improvements in Plant-Setting Machines, of which the following is a specification.

My invention relates to agricultural machinery; and the object of my invention is to provide an implement designed to automatically set and earth young plants.

My invention is fully shown in the accompanying drawings, in which:

Figure 1, is a side elevation of a machine embodying my invention; Fig. 2, is a plan view of the same; Fig. 3, is a sectional elevation on the line $a$—$a$, Fig. 1; Fig. 4, is a perspective view of a portion of the chain employed in connection with my improved plant setting mechanism; Fig. 5, is a perspective view of the plow or furrow opener, showing the plant guides carried thereby, and Fig. 6, is an end of a part of the structure, showing the clutch mechanism employed for placing the chain driving wheel in and out of engagement with the draft wheel of the structure.

The frame of my improved machine consists of two parts; the one part indicated at 1, carrying draft mechanism for moving an endless chain 2 forming the carrying part of the plant setting device, while the other part, indicated at 1ª carries earthing wheels 3; an opening plow 4 being disposed between said parts of the frame to prepare the ground to receive the plants. Mounted at the forward end of the part 1 of the structure are upright arms 5 in which a draft wheel 6 is journaled, which wheel drives, by means of sprocket wheels 7 and 8 and chain 9, another wheel 10, and over the wheel 10, the endless chain 2 passes; said chain having plant carrying fingers 11 and the wheel 10 having teeth 12 to engage and drive said chain. Between the rear end of the machine and said chain wheel 10, channel troughs or guideways 13 are provided for the chain whereby its direction of movement may be positively governed, and the chain is provided with side projections 14 whereby it may be retained by the overhanging flanges or lips 15 of the troughs 13.

The fingers 11 carried by the chain and adapted to receive the stems of the plants to be set are preferably covered with rubber or other suitable material (not shown) so as to prevent damage to the stems of the plants, and means are provided to spread said fingers, in the one instance to receive the plants and in the other to release them; their natural resiliency closing them after disengagement with such spreading means. The fingers may be formed of a folded piece of spring metal, as shown, or in any other approved way, preserving the desired resiliency, and while their design may vary they are preferably of the shape shown in Fig. 4. The folded end of the strip forming said fingers is secured to a cross-bar 16, carried by the links 17 of the chain and a rigid connection is made with said cross-bar so as to hold the fingers substantially at right angles to the chain.

In order to spread the fingers to receive the stem of the plant, a squared member 18 is placed within the folded piece of metal forming the same. The cross section of said member where it engages the fingers has two dimensions, and the fingers are shaped to receive and retain said member in proper relation therewith. When the member 18 lies in one position, it is relatively free from engagement with the fingers and the natural resiliency of the material forming the latter closes the same; but when said member 18 is turned at right angles to its former position, its width when in such position serves to spread the fingers sufficiently to permit them to engage the plant, as shown in Fig. 4. To accomplish this result, the members 18, carried by said fingers are provided with two sets of pins 19 and 20, and trips 21 and 22 are provided, one adjacent a table 23 for holding the plants before they are dropped by an attendant into engagement with the fingers; and the other adjacent the covering wheels so as to release the plants after they have been placed in the furrow. The fingers of the chain are open as the latter approaches the table 23; the latter being slotted for the passage of said chain, and having a curved end 24 following the contour of the driving wheel 10, and said fingers remain open to allow the attendant to place a plant therein and until just before they pass from said table. By this means the attendant is enabled to correct the feed and make sure that all the fingers have been fed, and the table is at such a height with respect to the fingers that it serves to level the plants therein and insure that they are grasped at substantially the same point in each instance and held substantially at right angles to such fingers. Just before each set of fingers passes from the table, the trip 21, conveniently carried by a part of the frame, engages the pins 19 of the member 18 which has been previously turned so as to spread said fingers, thereby releasing said member and permitting the fingers under the natural resiliency of the material forming the same to close against the plants.

After the machine has been put in motion and the operation of feeding the chain has commenced, the latter passes continuously with the plants to the plow, between the blades of which it is guided by the trough or channel 13, and after it passes the rear end of the plow, the trip 22 engages the pins 20 on the member 18, turning the latter in its seat between the fingers and spreading said fingers so as to release the plant. To insure the guidance of the plants in an upright position, the plow is provided on its interior with guides 25, and the trip 22 is placed on the channel or trough 13 just within the end of these guides in order that the latter will support the plant while the fingers are leaving the same. In the meanwhile the root end of the plant has entered the furrow, and the release of the same by the separation of the fingers preferably takes place directly opposite the earthing wheels 3 so that when such plant is disengaged from the carriers of the chain it has been firmly fixed in its position in the soil. It is to be noted that the trough or channel 13 is curved in its length so that although the plants leave the table 23 in a horizontal position, they are turned to the vertical position before being brought to the plow. The chain with the carrying fingers passes around an idler wheel 26, suitably journaled on the frame 1ª and returns with said fingers in the open position, ready for a further supply, to the table 23.

The draft wheel 6, journaled in the arms 5, is provided with clutching means for engagement with the sprocket wheel 7 driving the chain 9, as shown in Fig. 6. The sprocket wheel is loose on its shaft and has a notched hub 27 for engagement with a similarly notched hub 28 carried by the wheel 6. The wheel 7 is provided with a hub 29 on its opposite side to which a yoke 30 is attached pivoted to the frame 1, and a spring 31 is provided to normally maintain the hub of said wheel 7 in engagement with the hub of the wheel 6. When it is desired to move the structure without rotating the chain wheel and consequently driving the chain, said wheel 7 may be withdrawn from its engagement with the wheel 6 and held in the disengaged position by suitable means attached to the yoke arm 30.

The structure which I have designed is arranged to be operated by two men; one pushing the machine by means of the handles 35, while the other walks alongside and feeds the carriers of the chain. It will be understood, however, that the machine may be designed to be pulled by a horse and that a suitable draft attachment may be secured to the front portion 1 of the frame. The rear portion 1ª of the frame is provided with wheels 36 which serve to support the structure as well as to press the earth sufficiently adjacent the row of set plants.

For the purpose of operating the clutch, the yoke-arm 30 is connected to a member 37 arranged to slide in suitable ways in the frame 1, and to this member 37 a wire 38 is connected, extending rearwardly to the handle of the machine (not shown), which wire may be provided with a suitable operating grip (not shown). When it is desired to throw the chain wheel out of clutch with the draft wheel, the grip may be operated to pull the sliding member rearwardly, such action pressing the yoke-arm against the tension of the spring 31 and releasing the clutch faces. Other means for accomplishing the release of the clutch faces are within the scope of my invention, and I may employ a bell-crank lever between the sliding member and the yoke-arm 30.

The guide or channel 13 for the chain extends the full length of the same so that the chain may be turned in the manner indicated and kept under control. Where it passes around the wheel 12 having teeth to drive the chain, said guide or channel is slotted for the passage of said teeth.

I claim:

1. In a plant setting machine, the combination of a frame adapted to be traversed over the ground, an endless chain carried by said frame, means for moving said chain, resilient fingers carried by said chain for gripping plants to be set, and means carried by said fingers for controlling the spread of the same, said means being movable to two positions with respect to said fingers and capable of remaining in each of said positions until reset, said means expanding the fingers when disposed in one position and permitting said fingers to close under their own tension when disposed in the other position.

2. In a plant setting machine, the combination of a wheeled frame adapted to be traversed over the ground, an endless chain carried by said frame, means for moving said chain from the wheels of the frame, spring plant grasping fingers carried by said chain and tending normally to remain in a closed position, means carried by said fingers for controlling the spread of the same, said means being movable to two positions with respect to said fingers and capable of remaining in each of said positions until reset, said means expanding the fingers when disposed in one position and permitting said fingers to close under their own tension when disposed in the other position, and means for shifting said finger controlling means.

3. In a plant setting machine, the combination of a frame, a chain carried by said frame, means for driving said chain, guiding means for said chain, resilient fingers carried by the chain for gripping plants to be set, and means carried by said fingers for controlling the spread of the same, said means being movable to two positions with respect to said fingers and capable of remaining in each of said positions until reset, said means expanding the fingers when disposed in one position and permitting said fingers to close under their own tension when disposed in the other position.

4. In a plant setting machine, the combination of a wheeled frame, a chain carried by said frame, means for driving said chain from the wheels of the frame, guiding means for said chain, spring plant grasping fingers carried by the chain, means carried by said fingers for controlling the spread of the same, said means being movable to two positions with respect to said fingers and capable of remaining in each of said positions until reset, said means expanding the fingers when disposed in one position and permitting said fingers to close under their own tension when disposed in the other position, and means for shifting said finger controlling means to open the fingers.

5. In a plant setting machine, the combination of a frame, a chain carried by said frame, means for driving said chain, side clips carried by the links of said chain, guiding means for said chain arranged to engage said clips and retain the chain, spring plant grasping fingers carried by the chain normally closed, and means carried by said fingers for controlling the spread of the same, said means being movable to two positions with respect to said fingers and capable of remaining in each of said positions until reset, said means expanding the fingers when disposed in one position and permitting said fingers to close under their own tension when disposed in the other position.

6. In a plant setting machine, the combination of a wheeled frame, a chain carried by said frame, means carried by said frame whereby the chain may be driven from said wheels, side clips carried by the links of said chain, guiding means for said chain arranged to engage said clips, spring plant gripping fingers carried by the chain and normally closed, means carried by said fingers for controlling the spread of the same, said means being movable to two positions with respect to said fingers and capable of remaining in each of said positions until reset, said means expanding the fingers when disposed in one position and permitting said fingers to close under their own tension when disposed in the other position, and means for shifting said controlling means as the chain is moving.

7. In a plant setting machine, the combination of a frame, a chain, plant gripping fingers carried by said chain, a guiding channel for the same, means for driving said chain, an opening plow, the guiding channel for the chain extending through the top of said plow, and guides for the plants carried by said plow.

8. In a plant setting machine, the combination of a frame, supporting wheels therefor, a chain, plant gripping fingers carried by said chain, a guiding channel for the same, means for driving said chain from one of the supporting wheels, an opening plow, the guiding channel for the chain extending through the top of said plow, and guides for the plants carried by said plow.

9. In a plant setting machine, the combination of a frame, a chain, plant gripping fingers carried by said chain, a guiding channel extending the full length of said chain, means for driving said chain, a movable member carried by said fingers, said member when in one position serving to open the fingers and when in another position permitting said fingers to close, and trips carried by the guiding channel for operating the finger opening member.

10. In a plant setting machine, the combination of a frame, supporting wheels therefor, a chain, plant gripping fingers carried by said chain, a guiding channel for the same extending its full length, means for driving the chain from one of the supporting wheels, a movable member carried by said fingers, said member when in one position opening the fingers and when in another position permitting said fingers to close, and trips carried by said guiding channel for operating said finger opener.

11. In a plant setting machine, the combination of a frame, wheels for supporting said frame, a chain, means for driving said chain from one of the supporting wheels, a guiding channel for said chain, plant holding fingers carried by the chain in a normally closed position, a squared bar carried by the fingers whereby they may be held open when in one position and closed when in another position, and trips for actuating said bar.

12. In a plant setting machine, the combination of a frame, wheels for supporting said frame, a chain, means for driving said chain from one of the supporting wheels, a guiding channel for said chain, projections on the chain for engagement with said channel, plant holding fingers carried by the chain in a normally closed position, a squared bar carried by the fingers whereby they may be held open when in one position and closed when in another position, pins carried by the ends of said bar whereby it may be turned, and trips for actuating said pins.

13. In a plant setting machine, the combination of a movable chain having a series of resilient plant receiving fingers, a plant receiving table from which said fingers are fed, means carried by said fingers for controlling the spread of the same, said means being movable to two positions with respect to said fingers and capable of remaining in each of said positions until reset, said means expanding the fingers when in one position and permitting said fingers to close under their own tension when disposed in the other position, said fingers being presented to the table in the expanded position, and means adjacent said table for shifting said finger controlling means to permit the fingers to close on the stems of the plants before leaving said table.

14. In a plant setting machine, the combination of a movable chain having a series of resilient plant receiving fingers, means for feeding said fingers, said chain carrying the plants so that they may enter a previously recessed portion of the earth, means for closing the earth against the roots of said plants, means carried by said fingers for controlling the spread of the same, said means being movable to two positions with respect to said fingers and capable of remaining in each of said positions until reset, said means expanding the fingers when in one position and permitting said fingers to close under their own tension when disposed in the other position to hold the plants, and means for shifting said finger controlling means to release the plants after they have been earthed.

In testimony whereof, I have signed my name to this specification, in the presence of two subscribing witnesses.

SAMUEL T. DAVIS.

Witnesses:
 MURRAY C. BOYER,
 JOS. H. KLEIN.